Patented Sept. 24, 1946

2,408,011

UNITED STATES PATENT OFFICE 2,408,011

METHOD FOR PREVENTING THE CORROSION OF DISTILLATION EQUIPMENT

David C. Walsh, Jr., and Elza Q. Camp, Goose Creek, Tex., assignors to Standard Oil Development Company, a corporation of Delaware No Drawing. Application April 27, 1944, Serial No. 533,064

4 Claims. (Cl. 196—35)

The present invention relates to improvements in the preparation or synthesis of hydrocarbons boiling substantially within the gasoline range, and more particularly it relates to improved means for preventing the corrosion of distillation equipment employed in distilling iso-paraffin-olefin alkylate.

As is known, an iso-paraffin may be reacted with an olefin to form an addition product commonly called an alkylate. That is to say, iso-butane may be reacted with butylene to form a condensation product which is saturated and which boils substantially within the gasoline range. Generally the alkylation reaction is carried out in the presence of concentrated sulfuric acid. The sulfuric acid and alkylate recovered from the reactor are usually discharged into a separation vessel where the sulfuric acid and the alkylate are permitted to stratify. From the separation vessel the sulfuric acid is withdrawn as a bottoms and recycled to the reaction zone. The alkylate, on the other hand, is taken off overhead, washed with caustic soda solution, then washed with water and then pumped to a charge tank from which it is subsequently withdrawn and charged into a debutanizer column. The alkylate is then charged to a fractionating zone where the butane fraction and the octanes and lighter hydrocarbons in the case of butylene alkylate or the pentane fraction and octanes and lighter hydrocarbons in the case of pentylene alkylate are removed. The bottoms from this operation are then further reduced in a still for removal of any fractions suitable for use in motor gasoline but too high in boiling range for inclusion in aviation fuel.

The foregoing operation results in corrosion in the alkylate fractionating columns, in the reflux accumulators, in the transfer lines to the fractionating equipment, and in the charge storage tanks, but the major corrosion has been found to occur in the fractionating column preheaters and reboilers.

An aqueous caustic (2%–5% caustic) solution wash followed by a water wash has been employed for the elimination of $SO_2$ in the alkylate product going to the distillation unit charge tank. However, the use of caustic and water wash serve only to remove free $SO_2$ and entrained acid, but has not prevented the corrosion and fouling tendency of the alkylate during subsequent handling and processing. It is believed that decomposition of esters in the preheater and reboiler system results in the formation of deposits and volatile acidic materials, such as $SO_2$, since tests have indicated that heating the alkylate product to temperatures comparable to those used in the fractionating unit reboilers will cause $SO_2$ to be liberated along with a tarry material which is deposited. The production of this unstable material is not an inherent characteristic of the alkylation reaction but is probably the result of side reactions varying with operating conditions since sometimes the decomposition effect is very severe and at other times almost entirely negligible.

The injection of phenolic bodies such as tricresol or crude petroleum phenols into the alkylate is disclosed in pending application U. S. Serial No. 417,275, filed October 31, 1941, for John L. Hart which has issued as Patent No. 2,393,531, Jan. 22, 1946. The present invention represents an improvement over the aforementioned application in which phenolic products are injected into the alkylate.

In the present invention we have discovered that the corrosivity and fouling tendency of the alkylate, by compounds released therefrom by the heat treatment during the distillation, may be substantially eliminated by injecting into the alkylate an alkaline inhibitor, specifically an alkaline compound of a phenol. The amount of alkaline compound to be injected may be varied over a fairly wide range but generally will include amounts from .005 to .5% by volume, based on the total alkylate being treated.

In the injection of the alkaline inhibitor, it is preferred that the compound be introduced into the system at a point where the alkylate is flowing in a relatively turbulent stream. If the inhibitor is injected into the alkylate stream prior to distilling, and is allowed to come in contact with water and to remain in a quiescent state, it is likely that the beneficial effects of the inhibitor will be lost due to the inhibitor dissolving into the water phase rather than remaining in contact with the hydrocarbon phase. Consequently, we prefer to inject our inhibitor into the alkylate immediately prior to the alkylate entry into the distillation equipment.

The reasons for the unexpected benefits of our invention are not completely understood but it is believed to be a dual effect resulting from the alkalinity of the phenolic salt as well as the phenolic group itself. For example, in the aforementioned pending application, on which the present invention represents an improvement, the phenolic compounds are known to be distilled off and to be carried out with the alkylate. This is because of the appreciable vapor pressure of the phenols in the alkylate. On the other hand, the alkaline inhibitor of the present invention, which may be the sodium salt of a phenol, for example, has a relatively low vapor pressure and consequently remains in the bottom of the distillation tower with the heavy fractions where it exerts its beneficial effects. The sodium ion is believed to react with the acidic vapors at the point where they are released from the hydrocarbon solution, and the phenolic group is believed to exert an inhibiting effect in protecting the metallic surfaces from corrosion and also from deposition of the fouling bodies.

It is to be understood that any high boiling phenolic compound, such as a mono-, or polyhydric phenol after being converted to an alkaline salt is suitable in the practice of the present invention. Examples of such materials are tricresol, a mixture of ortho-, meta-, and paracresol, pyrogallol, resorcinol and hydroquinone. Another phenolic material, which we prefer to use in the practice of the present invention, is sodium salt of phenolic compounds obtained from petroleum. These phenolic compounds obtained from petroleum are commonly called petroleum phenols, and the methods of extracting them from petroleum fractions are well known and further mention need not be made here. It will suffice to say that the sodium salts of the petroleum phenols are quite effective in eliminating the aforesaid fouling and corrosion difficulties. These types of compounds are particularly useful since, besides the effect of the sodium ion and the phenolic group, it is believed that the petroleum phenols contain natural inhibitors against corrosion of metals by acidic compounds and this beneficial effect is also exerted in the form of the sodium salt.

Since the sodium salts of the petroleum phenols are heavy viscous fluids, it is preferred to inject them into the alkylate as a solution in a hydrocarbon having a boiling point lower than the boiling point of the phenols but higher than the boiling point of the heavier alkylate fractions. By using a fluxing liquid having a boiling point appreciably higher than the boiling point of the heaviest alkylate fraction, it is possible to separate the inhibiting material from the alkylate by distillation. The type of oil employed as a fluxing medium may vary considerably but generally it is preferred to use an oil in the gas oil or light lubricating oil boiling range. It is to be understood, of course, that the oil used as a fluxing medium preferably should be highly refined and should not in itself contribute any deleterious bodies to the alkylate.

In the present invention the use of sodium salts of phenolic compounds has been mentioned. It is to be understood, of course, that other alkali metals may be substituted for the sodium salt employed in the present invention. The sodium salt of the phenolic compounds may be obtained, particularly in the case where petroleum phenols are employed, by interrupting one of the steps in the obtaining of petroleum phenols. By failing to acidify the sodium salt of the phenols extracted from petroleum distillates, it is possible to obtain an inhibitor suitable for use in the present invention.

It is to be understood, also, that it is within the spirit and scope of the present invention to use various fractions of the petroleum phenols and then to react the various fractions with the alkali metals to obtain the desired salt for use in the practice of the present invention. Usually it will be preferred to use the high boiling phenols for conversion to the corresponding alkali metal salts.

The invention will be further illustrated by the following example. Alkylate produced by the sulfuric acid alkylation process from isobutane and butylene was treated in accordance with conventional methods including the step of distilling the alkylate in a fractionating column. It was found that the lower portion of the fractioning tower was being severely corroded by the alkylate and corrosion continued even after phenolic bodies were injected into the tower in accordance with the teaching of the Hart application, Serial No. 417,275. The operation was then altered by introducing a sodium salt of petroleum phenols into the alkylate being distilled in the fractionating column in accordance with the present invention. After this change in the operation, inspections of the fractionating tower showed that the corrosion had been substantially eliminated and that the tower was free from material which formerly deposited on and fouled the heating surfaces. The sodium salt of petroleum phenols was added to the alkylate by making up a solution of sodium salt in an equal volume of lubricating oil distillate; this salt was added to the alkylate in amounts corresponding to .025% by volume of the sodium salt based on the total alkylate. This solution did not affect the quality of the alkylate, produced as the overhead distillate, to any extent and it materially reduced the corrosion and fouling difficulties.

The nature and objects of the present invention having been completely described and illustrated, what we wish to claim as new and useful and to secure by Letters Patent is:

1. In the distillation of hydrocarbons which have been contacted with sulfuric acid, the step of adding to said hydrocarbons, immediately prior to their distillation, a small amount of an alkali metal salt of a phenol.

2. In the distillation of alkylate which has been contacted with sulfuric acid, the step of adding thereto, immediately prior to said distillation, a small amount of an alkali metal salt of phenol.

3. A method in accordance with claim 2 in which the phenol is derived from petroleum.

4. A method in accordance with claim 2 in which from .005 to .5% by volume of an alkali metal salt of a phenol is added to the alkylate.

DAVID C. WALSH, Jr.
ELZA Q. CAMP.